United States Patent [19]

Mallick et al.

[11] Patent Number: 5,752,014
[45] Date of Patent: May 12, 1998

[54] AUTOMATIC SELECTION OF BRANCH PREDICTION METHODOLOGY FOR SUBSEQUENT BRANCH INSTRUCTION BASED ON OUTCOME OF PREVIOUS BRANCH PREDICTION

[75] Inventors: Soummya Mallick, Austin; Albert John Loper, Cedar Park, both of Tex.

[73] Assignee: International Business Machines Corporation, Armonk, N.Y.

[21] Appl. No.: 639,577

[22] Filed: Apr. 29, 1996

[51] Int. Cl.$^6$ .................................................. G06F 9/32
[52] U.S. Cl. .................................................. 395/587
[58] Field of Search .................................. 395/587, 586, 395/581, 582

[56] References Cited

U.S. PATENT DOCUMENTS

| | | | |
|---|---|---|---|
| 5,454,117 | 9/1995 | Puziol et al. | 395/800 |
| 5,507,028 | 4/1996 | Liu | 395/383 |
| 5,553,255 | 9/1996 | Jain et al. | 395/582 |
| 5,584,001 | 12/1996 | Hoyt et al. | 395/585 |
| 5,634,103 | 5/1997 | Dietz et al. | 395/582 |

FOREIGN PATENT DOCUMENTS

| | | |
|---|---|---|
| 08 241198 | 3/1995 | Japan . |
| 2283595 | 5/1995 | United Kingdom . |

OTHER PUBLICATIONS

"Polymorphic Branch Predictor", IBM Technical Dislosure Bulletin, vol. 37, No. 7, pp. 109–113, Armonk, Ny, Jul. 1994.

Tayeb Gluma et al., "Microprocessor Design Innovations", Southcon 1994 Conference Record Proceedings, Institute of Electrical and Electronics Engineers, Mar. 2–31, pp. 502–507.

Primary Examiner—Parshotam S. Lall
Assistant Examiner—Gautam R. Patel
Attorney, Agent, or Firm—Brian F. Russell; Andrew J. Dillon

[57] ABSTRACT

A processor and method for speculatively executing branch instructions utilizing a selected branch prediction methodology are disclosed. The processor has one or more execution units for executing instructions, including a branch processing unit for executing branch instructions. The branch processing unit includes selection logic for selecting one of a plurality of branch prediction methodologies and a branch prediction unit for predicting the resolution of a conditional branch instruction utilizing the selected branch prediction methodology. The branch processing unit further includes execution facilities for speculatively executing the conditional branch instruction based upon the prediction. Based upon the outcome of the prediction, the selection logic selects a branch prediction methodology for predicting a subsequent conditional branch instruction so that branch prediction accuracy is enhanced. In one embodiment, the multiple branch prediction methodologies include static and dynamic branch prediction.

21 Claims, 4 Drawing Sheets

AUTOMATIC SELECTION OF BRANCH PREDICTION METHODOLOGY FOR SUBSEQUENT BRANCH INSTRUCTION BASED ON OUTCOME OF PREVIOUS BRANCH PREDICTION

BACKGROUND

1. Technical field

The technical field of the present specification relates in general to a method and system for data processing and in particular to a processor and method for executing branch instructions. Still more particularly, the technical field relates to a processor and method for speculatively executing a conditional branch instruction utilizing a selected one of multiple branch prediction methodologies.

2. Description of the Related Art

A state-of-the-art superscalar processor typically includes an instruction cache for storing instructions, an instruction buffer for temporarily storing instructions fetched from the instruction cache for execution, one or more execution units for executing sequential instructions, a branch processing unit (BPU) for executing branch instructions, a dispatch unit for dispatching sequential instructions from the instruction buffer to particular execution units, and a completion buffer for temporarily storing sequential instructions that have finished execution, but have not completed.

Branch instructions executed by the branch processing unit (BPU) of the superscalar processor can be classified as either conditional or unconditional branch instructions. Unconditional branch instructions are branch instructions that change the flow of program execution from a sequential path to a specified target execution path and which do not depend upon a condition supplied by the execution of another instruction. Thus, the branch specified by an unconditional branch instruction is always taken. In contrast, conditional branch instructions are branch instructions for which the indicated branch in program flow may be taken or not taken depending upon a condition supplied by the execution of another instruction. Conditional branch instructions can be further classified as either resolved or unresolved, based upon whether or not the condition upon which the branch depends is available when the conditional branch instruction is evaluated by the branch processing unit (BPU). Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to enhance performance, some processors speculatively execute unresolved branch instructions by predicting whether or not the indicated branch will be taken. Utilizing the result of the prediction, the fetcher is then able to fetch instructions within the speculative execution path prior to the resolution of the branch, thereby avoiding a stall in the execution pipeline if the branch is resolved as correctly predicted.

Processors having branch prediction facilities typically employ either a static or dynamic branch prediction methodology. One of the simplest implementations of static branch prediction is to guess all backward-going branches as taken and all forward-going branches as not taken. In an alternative implementation of static branch prediction, each branch instruction within a program is associated with a Y bit, which is set following a profiling operation of the program compiler to indicate to the branch processing unit (BPU) whether or not the branch should be predicted as taken. Thus, based upon information gleaned from the program during compilation, the compiler dictates whether or not each branch will be predicted as taken or not taken if executed speculatively. In contrast to the software-based approach utilized in static branch prediction, dynamic branch prediction records the resolution of particular branch instructions within a Branch History Table (BHT) and utilizes the previous resolutions stored in the table to predict subsequent branches.

Although the accuracy of both static branch prediction and dynamic branch prediction is fairly high, with static prediction averaging between 60%–70% accuracy and dynamic prediction averaging 90%–97% accuracy, the exclusive use of a single branch prediction methodology can result in a severe performance penalty when particular instruction scenarios occur. For example, a static prediction methodology that predicts forward branches as not taken and backward branches as taken will result in 100% misprediction for instruction sequences in which forward-going branches are always taken. Although this particular type of code sequence is ideal for dynamic branch prediction, static branch prediction is superior to dynamic branch prediction for other code sequences. For example, a branch contained within a loop that is taken on alternating count indices will be mispredicted 100% of the time utilizing dynamic branch prediction, but only 50% of the time utilizing static branch prediction. In addition to the problems with dynamic branch prediction attributable to erratic code, dynamic branch prediction can also result in poor prediction accuracy following a cold start of the processor due to a lack of an available branch history. Similarly, a processor which utilizes dynamic branch prediction can have poor prediction accuracy if the processor maintains only a small branch history table as is therefore susceptible to branch instruction aliasing.

To address the deficiencies inherent in each type of branch prediction, some processors provide a mode bit that enables the branch processing unit (BPU) to utilize either a static or dynamic branch prediction mechanism, depending on the state of the mode bit. However, such processors do not permit the branch processing unit (BPU) to intelligently select which branch prediction methodology should be employed for a particular instance of a branch instruction. Consequently, a processor and method for speculatively executing conditional branch instructions are needed which intelligently select one of multiple branch prediction methodologies.

SUMMARY

It is therefore one object of the present disclosure to provide an improved method and system for data processing.

It is another object of the present disclosure to provide an improved processor and method for executing branch instructions.

It is yet another object of the present disclosure to provide an improved processor and method for speculatively executing conditional branch instructions utilizing a selected one of multiple branch prediction methodologies.

The foregoing objects are achieved as is now described. A processor and method for speculatively executing branch instructions utilizing a selected branch prediction methodology are disclosed. The processor has one or more execution units for executing instructions, including a branch processing unit for executing branch instructions. The branch processing unit includes selection logic for selecting one of a plurality of branch prediction methodologies and a branch prediction unit for predicting the resolution of a conditional branch instruction utilizing the selected branch prediction methodology. The branch processing unit further includes execution facilities for speculatively executing the conditional branch instruction based upon the prediction. Based upon the outcome of the prediction, the selection logic selects a branch prediction methodology for predicting a subsequent conditional branch instruction so that branch prediction accuracy is enhanced. In one embodiment, the multiple branch prediction methodologies include static and dynamic branch prediction.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
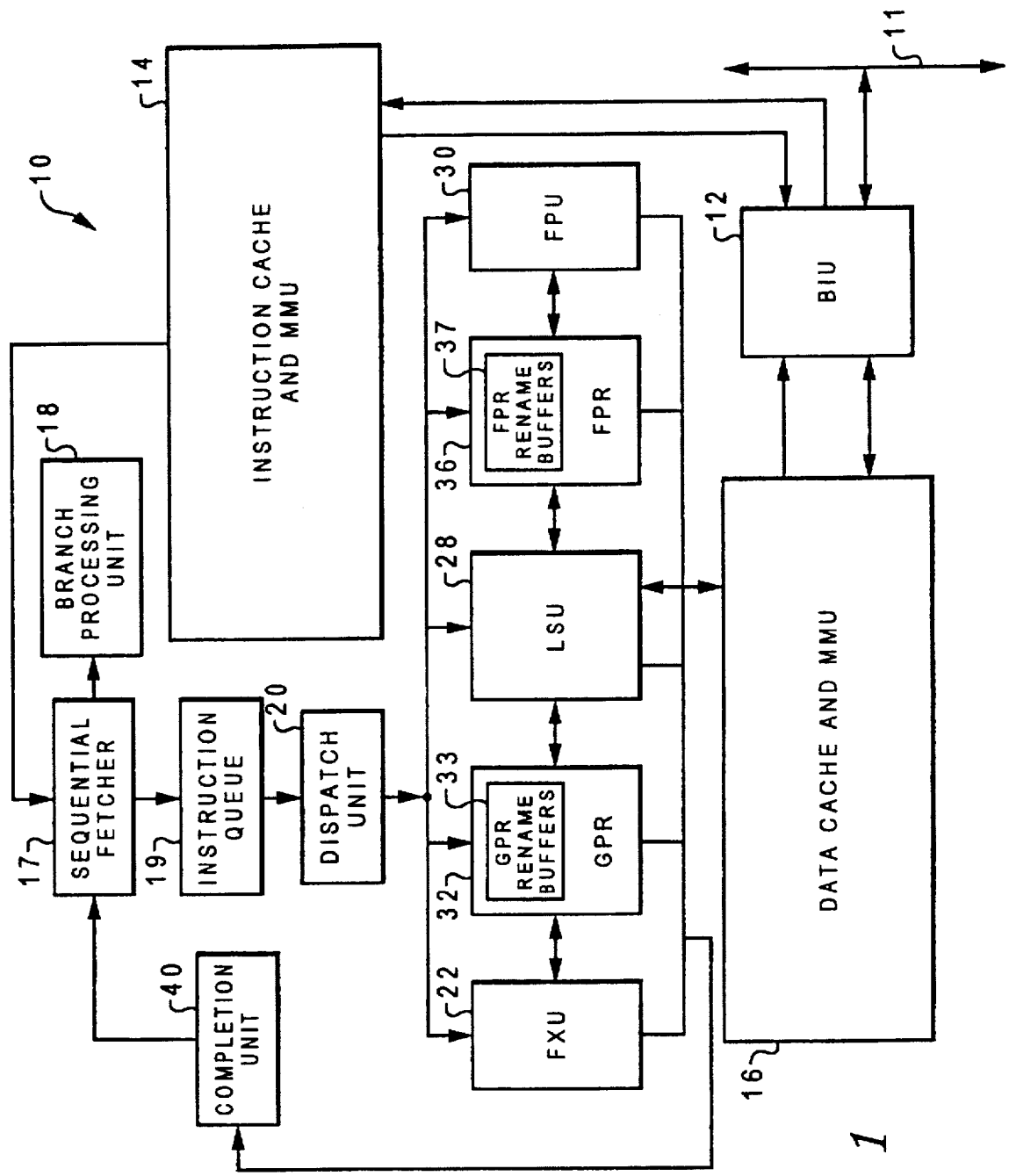
FIG. 1 illustrates a block diagram of an illustrative embodiment of a processor, which includes a branch processing unit.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate that other suitable processors can be utilized. As illustrated in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a data processing system.

BIU 12 is connected to instruction cache 14 and data cache 16 within processor 10. High-speed caches, such as instruction cache 14 and data cache 16, enable processor 10 to achieve relatively fast access time to a subset of data or instructions previously transferred from main memory to caches 14 and 16, thus improving the speed of operation of the data processing system. Instruction cache 14 is further coupled to sequential fetcher 17, which fetches instructions for execution from instruction cache 14 during each cycle. Sequential fetcher 17 transmits instructions fetched from instruction cache 14 to both branch processing unit (BPU) 18 and instruction queue 19, which decode the instructions to determine whether the instructions are branch or sequential instructions. Branch instructions are retained by BPU 18 for execution and cancelled from instruction queue 19; sequential instructions, on the other hand, are cancelled from BPU 18 and stored within instruction queue 19 for subsequent execution by other execution circuitry within processor 10.

In the depicted illustrative embodiment, in addition to BPU 18, the execution circuitry of processor 10 comprises multiple execution units for sequential instructions, including fixed-point unit (FXU) 22, load/store unit (LSU) 28, and floating-point unit (FPU) 30. As is well-known to those skilled in the computer arts, each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed opportunistically by FXU 22, LSU 28, and FPU 30 in any order as long as data dependencies are observed. In addition, instructions are processed by each of FXU 22, LSU 28, and FPU 30 at a sequence of pipeline stages. As is typical of many high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. As noted above, sequential instructions fetched from instruction cache 14 are stored by sequential fetcher 17 within instruction queue 19, while branch instructions are removed (folded out) from the sequential instruction stream. As described below with reference to FIG. 2, branch instructions are executed by BPU 18, which includes a novel branch prediction mechanism that enables BPU 18 to speculatively execute unresolved conditional branch instructions utilizing a selected one of multiple branch prediction methodologies.

During the decode/dispatch stage, dispatch unit 20 decodes and dispatches one or more instructions from instruction queue 19 to execution units 22, 28, and 30. During the decode/dispatch stage, dispatch unit 20 also allocates a rename buffer within GPR rename buffers 33 or FPR rename buffers 37 for each dispatched instruction's result data. According to a the depicted illustrative embodiment, instructions dispatched by dispatch unit 20 are also passed to a completion buffer within completion unit 40. Processor 10 tracks the program order of the dispatched instructions during out-of-order execution utilizing unique instruction identifiers.

During the execute stage, execution units 22, 28, and 30 execute sequential instructions received from dispatch unit 20 opportunistically as operands and execution resources for the indicated operations become available. Each of execution units 22, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. Then, execution units 22, 28, and 30 notify completion unit 40 which instructions stored within the completion buffer of completion unit 40 have finished execution. Finally, instructions are completed by completion unit 40 in program order by transferring data results of the instructions from GPR rename buffers 33 and FPR rename buffers 37 to GPRs 32 and FPRs 36, respectively.

Figure 2:
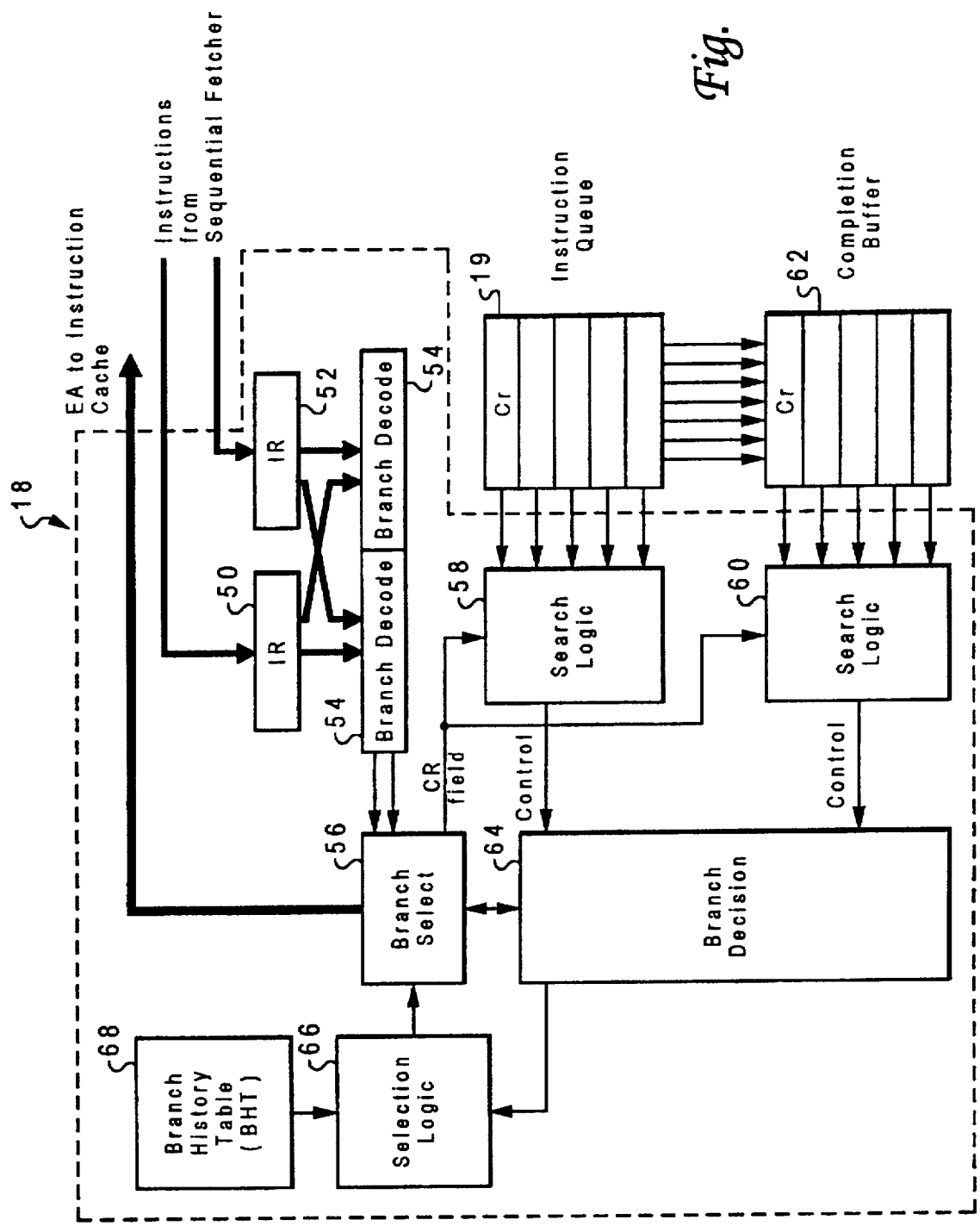
FIG. 2 depicts a more detailed block diagram of the branch processing unit illustrated within FIG. 1.
Figure 5:
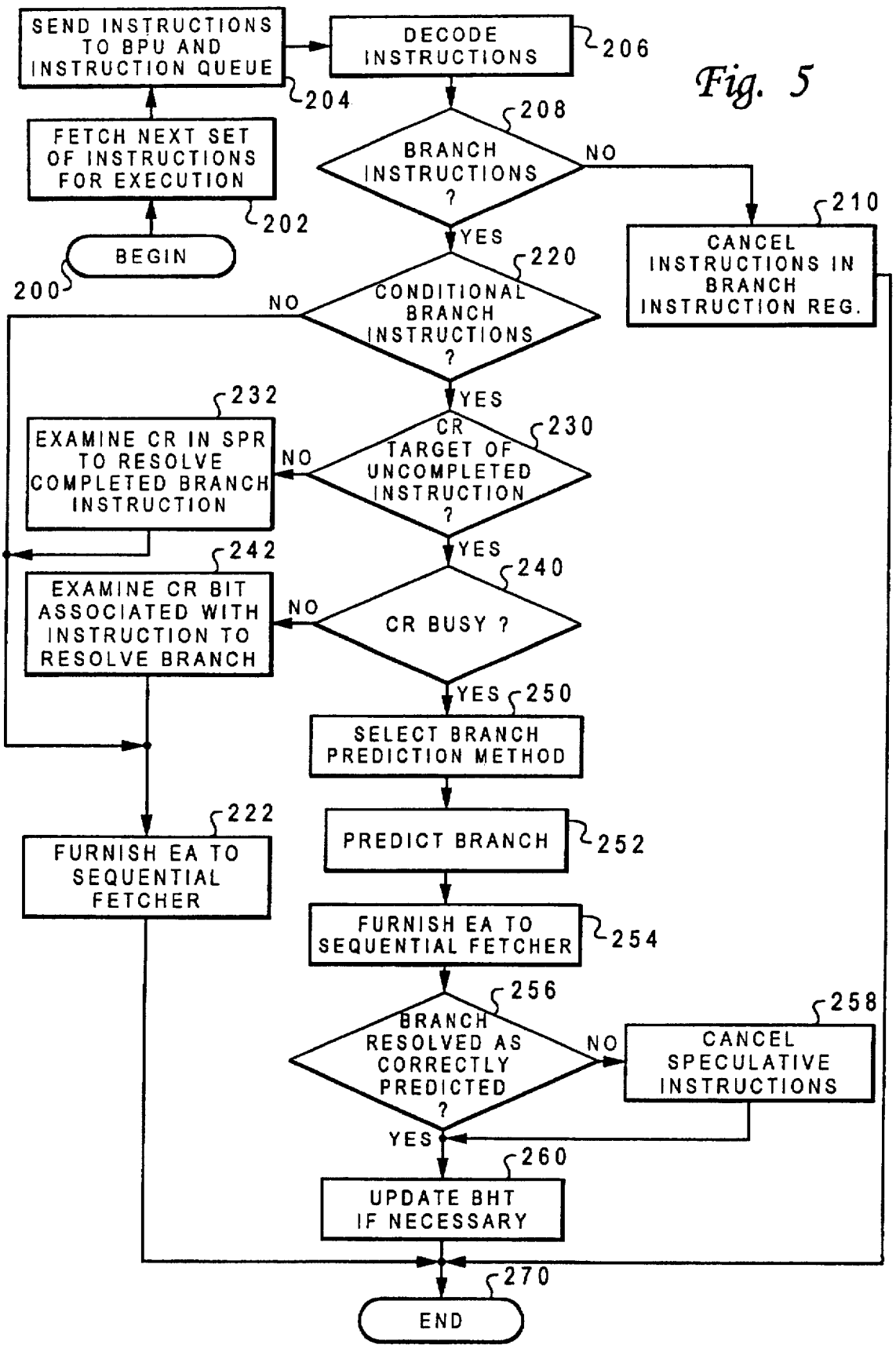
FIG. 5 is a flowchart illustrating a method for executing a branch instruction in accordance with the illustrative embodiment depicted within FIG. 1.

Referring now to FIGS. 2 and 5, there are depicted a more detailed block diagram representation of BPU 18 of processor 10 and a flowchart detailing the execution of a branch instruction within BPU 18. With reference first to FIG. 5, the process begins at block 200 and thereafter proceeds to blocks 202 and 204. Blocks 202 and 204 depict sequential fetcher 17 retrieving the next set of sequential instructions from instruction cache 14 and sending the fetched instructions to BPU 18 and instruction queue 19. As illustrated within FIG. 2, BPU 18 receives up to two instructions each cycle from sequential fetcher 17 and stores the instructions within instruction registers (IR) 50 and 52. Storing the fetched instructions within instruction registers 50 and 52 triggers decoding of the instructions by branch decoders 54, as illustrated at block 206 of FIG. 5.

Still referring to FIG. 5, in response to a determination at block 208 that an instruction stored within one of instruction registers 50 and 52 is a non-branch instruction, the instruction is simply discarded, as depicted at block 210. Thereafter, the process passes from block 210 to block 270, where the processing of the discarded instruction terminates. If, on the other hand, a determination is made at block 208 that an instruction stored within one of instruction registers 50 and 52 is a branch instruction, ii a further determination is made at block 220 whether or not the instruction is a conditional branch instruction. Unconditional branch instructions are simply passed to branch select unit 56, which computes the effective address (EA) of the target instruction. As illustrated at block 222, branch select unit 56 then transmits the EA to instruction cache 14 to initiate the fetching of sequential instructions at the target address.

Returning to block 220, if a determination is made by one of branch decode units 54 that a fetched instruction is a conditional branch instruction, the process proceeds to block 230, which depicts a determination of whether or not the condition register (CR) field upon which the branch depends is the target of an instruction in progress, that is, an instruction which has been fetched, but has not completed. In order to make the determination illustrated at block 230, the instruction is passed to branch select unit 56, which sends an indication of which CR field the branch is dependent upon to search logic 58 and 60. Utilizing the CR field identifier received from branch select unit 56, search logic 58 examines the instructions within instruction queue 19 to determine if the CR field upon which the branch depends is a target of one or more instructions within instruction queue 19. A concurrent determination is made by search logic 60 if the CR field of interest is a target of a dispatched, but uncompleted instruction contained within completion buffer 62 of completion unit 40. If the CR field of interest is not the target of any instruction in progress, the branch instruction has already been resolved and the CR field upon which the branch depends is present within an unillustrated CR special purpose register (SPR) that stores a historic state of the CR. Accordingly, the process proceeds from block 230 to block 232, which depicts branch decision unit 64 examining the CR field of interest within the CR SPR and resolving the conditional branch, if possible. The resolution of the branch is then supplied to branch select unit 56. Thereafter, as illustrated at block 222, branch select unit 56 computes the EA of the target instruction and transmits the EA to instruction cache 14.

Returning now to block 230, if a determination is made by search logic 58 or 60 that the CR field of interest is the target of an instruction in progress, the process proceeds to block 240, which illustrates a determination by search logic 60 whether or not the CR bit supplied by the instruction is available. The CR bit supplied by an instruction is available if the instruction has finished completion and the CR bit generated by the execution of the instruction is stored within completion buffer 62. If the CR bit is available, the process proceeds from block 240 to block 242, which depicts branch decision unit 64 examining the CR bit associated with the instruction to resolve the branch. In addition, branch decision unit 64 supplies the resolution of the conditional branch instruction to branch select 56, which as illustrated at block 222, computes the EA of the next instructions to be fetched and forwards the EA to instruction cache 14.

Referring again to block 240, if the CR bit is not yet available (i.e., the instruction has not been dispatched or has not yet finished execution), the process then passes to blocks 250–260, which depict the speculative execution of an unresolved conditional branch instruction. Thus, branch decision unit 64 notifies selection logic 66 that the CR bit is not available, indicating that the instruction is to be executed speculatively by prediction. Next, as illustrated at block 250, selection logic 66 selects a branch prediction methodology. According to an important aspect of the illustrative embodiment and as described in detail with reference to FIGS. 3 and 4, selection logic 66 selects a branch prediction methodology based upon the outcomes of past predictions, which are stored within branch history table (BHT) 68. Thus, in contrast to prior art processors which support multiple branch prediction modes, the illustrative embodiment depicted in FIG. 1 intelligently and dynamically selects a best branch prediction methodology based upon the outcomes of prior predictions. Utilizing the selected branch prediction methodology, branch decision unit 64 predicts the branch as taken or not taken and indicates the prediction to branch select unit 56, as depicted at block 252. Thereafter, as illustrated at block 254, branch select unit 56 calculates and transmits the EA of the target instruction to instruction cache 14.

The process illustrated in FIG. 5 proceeds from block 254 to block 256, which depicts a determination of whether or not the conditional branch instruction resolved as correctly predicted. The determination depicted at block 256 is made by branch decision unit 64, which receives the CR bit upon which the branch depends from search logic 60 following the finish of the associated instruction. If a determination is made by branch decision unit 64 that the branch was mispredicted, the process passes to block 258, which depicts branch decision unit 64 cancelling instructions within the speculative execution path of the mispredicted branch instruction from instruction queue 19 and execution units 22, 28, and 30. The process then proceeds to block 260. Those skilled in the art will appreciate that for processor implementations which permit more then one level of speculation, all speculative instructions need not be cancelled, but only those which were fetched in response to misprediction of the branch. Returning to block 256, the process proceeds from block 256 to block 260 in response to a determination at block 256 that the branch was correctly predicted. Block 260 depicts selection logic 66 updating BHT 68, if necessary, to ensure that the appropriate branch prediction methodology is selected for subsequent speculative executions of the conditional branch instruction. Thereafter, the process terminates at block 270.

Figure 3:
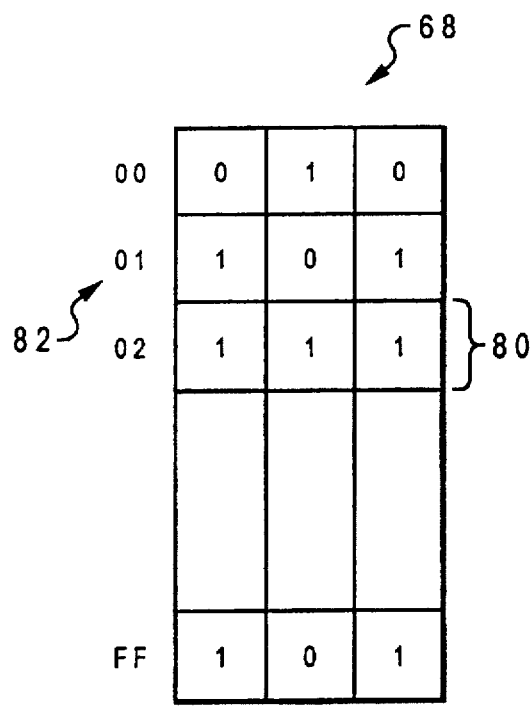
FIG. 3 a pictorial representation of the branch history table (BHT) of the branch processing unit (BPU) depicted within FIG. 2.

With reference now to FIG. 3, there is illustrated a pictorial representation of branch history table (BHT) 68 of BPU 18. As depicted, BHT 68 comprises a table including 256 entries 80, which are each accessed utilizing an index 82. In the depicted embodiment, each index 82 comprises the eight least significant bits of a branch instruction address. Thus, for example, the branch history of instructions having an address ending with 00h are stored within the first entry 80, branch instructions having addresses ending with 01h are stored in the second entry, and so on. As depicted, each entry 80 comprises three bits, which together specify one of seven prediction states (an eighth possible state is unused) for a subsequent conditional branch instruction. As with conventional branch history tables, a prediction state stored within an entry 80 of BHT 68 is updated following the resolution of the associated branch as taken or not taken in order to more accurately predict a subsequent execution of that branch instruction.

Figure 4:
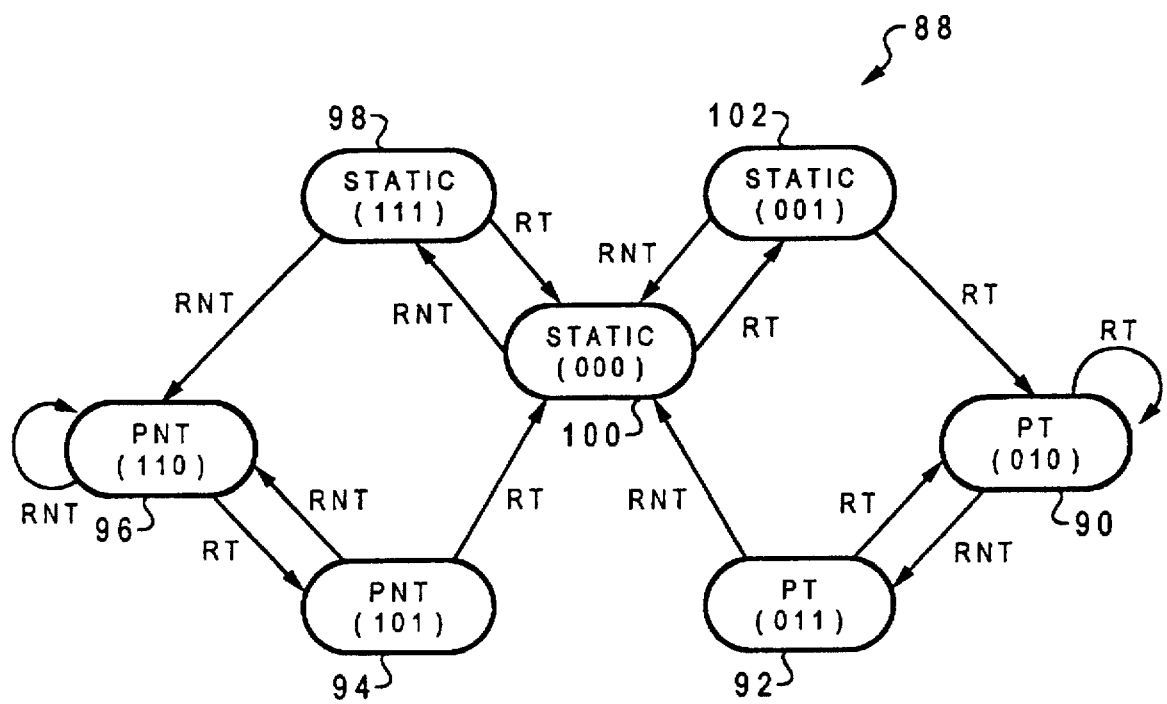
FIG. 4 depicts a state diagram of the method employed by the branch processing unit illustrated in FIG. 2 to select a branch prediction methodology utilized to predict the resolution of a speculatively executed conditional branch instruction.

Referring now to FIG. 4, there is depicted an illustrative embodiment of a state machine utilized to select a branch prediction methodology. State machine 88 comprises seven states, including four dynamic prediction states 90–96 and three static prediction states 98–102. As indicated, each of prediction states 90–102 corresponds to one of the seven possible settings of each entry 80 within BHT 68.

Referring first to static prediction state 100, if a branch instruction to be predicted maps to an entry 80 of BHT 68 that is set to "000," static branch prediction is utilized to predict whether or not the branch should be taken. If the branch is resolved as taken, entry 80 within BHT 68 is updated to "001," as illustrated at static prediction state 102.

It is important to note that state machine 88 proceeds from static prediction state 100 to static prediction state 102 in response to resolution of the branch as taken regardless of whether or not the branch was correctly predicted. When the conditional branch instruction is next predicted, static branch prediction is again utilized as specified by static prediction state 102. If the branch is again resolved as taken, entry 80 within BHT 68 is updated to "010" to indicate that dynamic branch prediction is to be utilized for a next prediction, as illustrated by dynamic prediction state 90.

Thereafter, state machine 88 remains at dynamic prediction state 90 as long as subsequent branch predictions are resolved as taken. However, in response to the resolution of a branch as not taken, state machine 88 proceeds from dynamic prediction state 90 to dynamic prediction state 92 and entry 80 within BHT 68 is updated to "011." When entry 80 set to "011", which corresponds to dynamic prediction state 92, the branch instruction which maps to entry 80 will again be predicted as taken. In response to a resolution of the branch as taken (i.e., correctly predicted), state machine 88 returns to dynamic prediction state 90, which has been described. However, in response to a resolution of the branch as not taken, the state machine 88 returns from dynamic prediction state 92 to static prediction state 100.

Referring again to static prediction state 100, if the branch instruction is resolved as not taken, the state machine 88 passes from static prediction state 100 to static prediction state 98, at which entry 80 is updated to "111." If a next occurrence of the branch instruction is resolved as taken, state machine 88 returns from static prediction state 98 to static prediction state 100, which has been described. On the other hand, if the branch instruction is resolved as not taken, state machine 88 proceeds from static prediction state 98 to dynamic prediction state 96, at which entry 80 is updated to the "110."

Conditional branches are predicted as not taken while state machine 88 is at dynamic branch prediction state 96 and entry 80 is correspondingly set to "110." If a predicted conditional branch is resolved as not taken, state machine 88 remains at dynamic prediction state 96. Alternatively, if a predicted conditional branch is resolved as taken, state machine 88 proceeds to dynamic prediction state 94, which corresponds to the BHT setting "101." Again, conditional branches are predicted as not taken when state machine 88 is at dynamic prediction state 94. If a branch predicted as not taken at dynamic prediction state 94 is resolved as not taken, state machine 88 returns to dynamic prediction state 96, which has been described. However, if the branch is resolved as taken, the process returns to static prediction state 100, which has also been described.

As can be seen from the foregoing description of FIG. 4, while state machine 88 is in one of static prediction states 98–102, the direction of branch resolution determines the next state of the prediction mechanism. After a branch is resolved as taken or not taken two consecutive times, a dynamic branch prediction methodology is utilized. Similarly, if state machine 88 is in one of dynamic prediction states 90 or 96, branches are predicted utilizing static branch prediction following two consecutive branch mispredictions. Although FIG. 4 depicts an illustrative embodiment of state machine 88, those skilled in the art will appreciate that other state machines can be implemented which enable a branch prediction methodology to be intelligently selected based upon branch history. Furthermore, those skilled in the art will appreciate that multiple types of static and dynamic prediction may be utilized. For example, BPU 18 can implement a simple static branch prediction scheme that predicts the resolution of a branch instruction based upon whether the indicated branch is a forward or backward branch; alternatively, more complex static branch prediction schemes can be employed which predict branch instructions based upon information learned during program compilation.

While an illustrative embodiment has been particularly shown and described, it will be understood by those skilled in the art that various changes in form and detail may be made therein without departing from the spirit and scope of the illustrative embodiment.

What is claimed is:

1. A processor, comprising:
   one or more execution units for executing instructions, said one or more execution units including a branch processing unit for executing branch instructions, said branch processing unit including:
   selection logic for selecting one of a plurality of branch prediction methodologies;
   a branch prediction unit for predicting a resolution of a conditional branch instruction utilizing said selected branch prediction methodology; and
   means for speculatively executing said branch instruction according to said prediction;
   wherein said selection logic automatically selects a branch prediction methodology from said plurality of branch prediction methodologies for predicting a resolution of a subsequent conditional branch instruction in response to an outcome of said prediction.

2. The processor of claim 1, wherein said plurality of branch prediction methodologies includes dynamic branch prediction.

3. The processor of claim 2, and further comprising:
   a branch history table, wherein said branch history table stores an indication whether said conditional branch instruction should be predicted as taken or not taken if dynamic branch prediction is utilized.

4. The processor of claim 3, wherein said plurality of branch prediction methodologies includes static branch prediction.

5. The processor of claim 4, said selection logic comprising:
   means, responsive to a first selected number of incorrect predictions of conditional branch instructions utilizing dynamic branch prediction, for selecting static branch prediction; and
   means, responsive to a resolution of a second selected number of statically predicted conditional branch instructions as all taken or not taken, for selecting dynamic branch prediction.

6. The processor of claim 1, wherein said processor has an associated memory for storing instructions, said processor further comprising a fetcher, wherein said fetcher fetches from memory one or more instructions for execution within a speculative execution path indicated by said prediction.

7. The processor of claim 6, said processor further comprising:
   means for cancelling said instructions within said speculative execution path in response to a resolution of said conditional branch instruction as mispredicted.

8. A data processing system, comprising:
   a bus;
   a a memory coupled to said bus, wherein said memory stores instructions to be executed;
   a fetcher for fetching instructions from said memory, said fetcher being coupled to said memory via said bus;
   one or more execution units for executing fetched instructions, said one or more execution units including a branch processing unit for executing branch instructions, said branch processing unit including:
   selection logic for selecting one of a plurality of branch prediction methodologies;
   a branch prediction unit for predicting a resolution of a conditional branch instruction utilizing said selected branch prediction methodology; and
   means for speculatively executing said branch instruction according to said prediction;
   wherein based upon an outcome of said prediction, said selection logic automatically selects a branch prediction methodology from said plurality of branch prediction methodolgies for predicting a resolution of a subsequent conditional branch instruction, such that branch prediction accuracy is enhanced.

9. The data processing system of claim 8, wherein said plurality of branch prediction methodologies includes dynamic branch prediction.

10. The data processing system of claim 9, and further comprising:
    a branch history table, wherein said branch history table stores an indication whether or not said conditional branch instruction should be predicted as taken or not taken if dynamic branch prediction is utilized.

11. The data processing system of claim 10, wherein said plurality of branch prediction methodologies includes static branch prediction.

12. The data processing system of claim 11, said selection logic comprising:
    means, responsive to a first selected number of incorrect predictions of conditional branch instructions utilizing dynamic branch prediction, for selecting static branch prediction; and
    means, responsive to a resolution of a second selected number of statically predicted conditional branch instructions as all taken or not taken, for selecting dynamic branch prediction.

13. The data processing system of claim 8, wherein said fetcher fetches from said memory one or more instructions for execution within a speculative execution path indicated by said prediction.

14. The data processing system of claim 13, and further comprising:
    means for cancelling said instructions within said speculative execution path in response to a resolution of said conditional branch instruction as mispredicted.

15. A method within a processor for speculatively executing a conditional branch instruction, said method comprising:
    selecting one of a plurality of branch prediction methodologies to predict a resolution of a conditional branch instruction;
    predicting a resolution of said conditional branch instruction as taken or not taken utilizing said selected branch prediction methodology;
    speculatively executing said conditional branch instruction according to said prediction;
    thereafter, resolving said conditional branch instruction as taken or not taken; and
    in response to said resolution of said branch instruction, utilizing an outcome of said prediction to automatically select a branch prediction methodology from said plurality of branch prediction methodologies for predicting a resolution of a subsequent conditional branch instruction, wherein branch prediction accuracy is enhanced.

16. The method for speculatively executing a conditional branch instruction of claim 15, wherein said plurality of branch prediction methodologies includes dynamic branch prediction.

17. The method for speculatively executing a conditional branch instruction of claim 16, said method further comprising:

storing an indication of whether or not said subsequent conditional branch instruction should be predicted as taken or not taken utilizing dynamic branch prediction.

18. The method for speculatively executing a conditional branch instruction of claim 17, wherein said plurality of branch prediction methodologies includes static branch prediction.

19. The method for speculatively executing a conditional branch instruction of claim 18, wherein said step of selecting one of a plurality of branch prediction methodologies comprises:

in response to a first selected number of incorrect predictions of branch instructions utilizing dynamic branch prediction, selecting static branch prediction; and in response to a resolution of a second selected number of statically predicted branch instructions as all taken or not taken, selecting dynamic branch prediction.

20. The method for speculatively executing a conditional branch instruction of claim 15 said method further comprising fetching one or more instructions for execution within a speculative execution path indicated by said prediction.

21. The method for speculatively executing a conditional branch instruction of claim 20, said method further comprising cancelling said instructions within said speculative execution path in response to a resolution of said conditional branch instruction as mispredicted.

* * * * *